United States Patent
Chlandová et al.

(10) Patent No.: US 12,138,823 B2
(45) Date of Patent: Nov. 12, 2024

(54) FIREPROOF WATER-RESISTANT WOOD CHIP MATERIAL AND METHOD OF ITS PRODUCTION

(71) Applicant: FIRST POINT A.S., Hodonin (CZ)

(72) Inventors: Gabriela Chlandová, Borohrádek (CZ); Petr Španiel, České Meziříčí (CZ)

(73) Assignee: First Point A.S., Hodonin (CZ)

( * ) Notice: Subject to any disclaimer, the term of this patent is extended or adjusted under 35 U.S.C. 154(b) by 114 days.

(21) Appl. No.: 17/627,661

(22) PCT Filed: Jun. 9, 2020

(86) PCT No.: PCT/CZ2020/000026
§ 371 (c)(1),
(2) Date: Jan. 15, 2022

(87) PCT Pub. No.: WO2021/023319
PCT Pub. Date: Feb. 11, 2021

(65) Prior Publication Data
US 2022/0314486 A1    Oct. 6, 2022

(30) Foreign Application Priority Data
Aug. 6, 2019   (CZ) ............................ CZPV2019-510

(51) Int. Cl.
| | |
|---|---|
| *C09D 1/02* | (2006.01) |
| *B27K 3/20* | (2006.01) |
| *B27K 3/52* | (2006.01) |
| *B27N 1/02* | (2006.01) |
| *B27N 3/00* | (2006.01) |
| *B27N 3/02* | (2006.01) |
| *C09D 197/02* | (2006.01) |
| *C09K 21/02* | (2006.01) |

(52) U.S. Cl.
CPC ................. *B27N 3/002* (2013.01); *B27K 3/20* (2013.01); *B27K 3/52* (2013.01); *B27N 1/0209* (2013.01); *B27N 3/02* (2013.01); *C09D 1/02* (2013.01); *C09D 197/02* (2013.01); *C09K 21/02* (2013.01); *B27K 2240/30* (2013.01); *B27K 2240/70* (2013.01)

(58) Field of Classification Search
CPC .............. C09D 1/02; C09D 1/04; C09D 5/18; C09D 197/00; C09D 197/005; C09D 197/02
See application file for complete search history.

(56) References Cited

U.S. PATENT DOCUMENTS

| | | | |
|---|---|---|---|
| 2010/0015194 A1 | 1/2010 | Donath et al. | |
| 2022/0267613 A1* | 8/2022 | Chlandová | ............... B27K 3/20 |
| 2022/0356402 A1* | 11/2022 | Chlandová | ............. C04B 14/42 |

FOREIGN PATENT DOCUMENTS

| | | |
|---|---|---|
| CN | 105538471 A | 5/2016 |
| CN | 108911688 A | 11/2018 |
| CZ | 31399 U1 | 1/2018 |
| RU | 2267460 C2 * | 1/2006 |
| WO | 02100796 A1 | 12/2002 |
| WO | 2017072689 A1 | 5/2017 |
| WO | 2018049537 A1 | 3/2018 |
| WO | 2018193398 A1 | 10/2018 |

OTHER PUBLICATIONS

Translation of RU-2267460 C2 (Year: 2002).*
Translation of CZ-31399-U1 (Year: 2017).*
PQ Corporation Bulletin 17-2A, Typical Property Data for PQ Liquid Sodium Silicates (Year: 2013).*
International Search Report for PCT/CZ2020/000026, (Sep. 2020).
Search Report for Priority Application PV 2019-510, (Jan. 2020).

* cited by examiner

*Primary Examiner* — Hoa (Holly) Le
(74) *Attorney, Agent, or Firm* — Austin LLP

(57) ABSTRACT

A wood chip material, especially a fireproof water resistant wood chip material, especially a fireproof water resistant wood chip material to make oriented strand boards which consists of a mixture containing 30 to 43 weight percent of wood chips, 53 to 61.9 weight percent of an aqueous solution of silicate, 2 to 5 weight percent of aluminium hydroxide, 1 to 3 weight percent of water, 0.1 to 1 weight percent of a stabilizer of the aqueous solution of silicate, and a hardener of the aqueous solution of sodium silicate in the concentration of 0.5 to 5 weight percent to the pure aqueous solution of sodium silicate providing always that the density of the aqueous solution of sodium silicate ranges from 1370 to 1400 kg/m$^3$ and the $SiO_2$ to $NA_2O$ molar ratio in the aqueous solution of sodium silicate ranges from 3.2 to 3.4. A method of production of a wood chip material, especially method of production of a fireproof water resistant wood chip material, especially method of production of a fireproof water resistant wood chip material to make oriented strand boards according to which, as the first step, the aluminium hydroxide is mixed with water, then wood chips are added into the mixture and everything is stirred thoroughly in such a manner that a wood chip mixture is formed, then the stabilizer of the aqueous solution of sodium silicate is added in the aqueous solution of silicate and after that the hardener of the aqueous solution of sodium silicate is admixed in this solution. Then the solution is stirred for 1 to 10 minutes until a binding solution is formed. Then the wood chip mixture is poured, at continuous stirring, in the binding solution and everything is stirred thoroughly again. Then the resulting mixture is poured in the place of application.

5 Claims, No Drawings

FIREPROOF WATER-RESISTANT WOOD CHIP MATERIAL AND METHOD OF ITS PRODUCTION

CROSS-REFERENCE TO RELATED APPLICATIONS

This application is a U.S. National Stage under 35 U.S.C. § 371 of International Application No. PCT/CZ2020/000026, as filed on Jun. 9, 2020, which claims priority to the Czech Republic patent application No. PV 2019-510 filed on Aug. 6, 2019 and entitled "Wood Chip Material and Method of its Production." The disclosure of each of these applications is incorporated by reference herein for all purposes.

TECHNICAL FIELD

The invention relates to a wood chip material, especially to a fireproof water-resistant wood chip material, especially to a fireproof water-resistant wood chip material to make oriented strand boards (OSB) and to method of its production.

STATE OF THE ART

There exists a wide range of technical designs of chipboards including the socalled oriented strand boards (OSB) in which the chips in the surface layers are oriented parallel to the longer edge of the board which, at the same time, determines the main direction of the strength of the board. The chips in the middle layer are oriented perpendicularly to the main axis by which higher rigidity and strength in the main direction of the board is achieved. The chips are impregnated with additives, e.g. by thiosulphates. As for binding agents, for example, polyurethane or artificial (e.g. phenol formaldehyde or urea formaldehyde) resins are used. In moisture-resistant boards, liquid paraffin in the form of paraffinic emulsion is used as well.

The patent document EP 2125311 describes an oriented strand board with admixed pulverized polyurethane and various fibres where organic polymers are used as binding agents. Its disadvantage is its high flammability.

Another patent document CN 108559151 describes a board consisting of wood chips and rubber powder that are bound together with polyurethane. A disadvantage of this board is its flammability and the fact that it has limited insulating powers.

The patent document EP 2078599 describes a design of a board with micro chips where urea formaldehyde resin is used as a binding agent. Its disadvantage is its high flammability.

The making of oriented strand boards (OSB) by pressing them from chips and aerogel is known from patent document EP 2864087. Here, phenol formaldehyde resin is used as a binding agent. A disadvantage of this board is, again, its flammability and, in addition to that, a high price of the aerogel and a very complicated production technology. In this particular case, another big problem is absorptivity of the board.

Highly flammable is also the oriented strand board (OSB) known from patent document CZ PV 1990-1594 where paraffin is used as a binding agent.

The oriented strand board known from utility design CZ 31399 is also flammable. Its another disadvantage is the fact that it is very hard and, essentially, not flexible at all which substantially limits the scope of its application. Another disadvantage of the OSB described in this utility design is the fact that, in view of the very exactly defined shape of the chips, it is not even really productible.

It is obvious from the above-mentioned the state of the art that the main disadvantage of the chipboards known from the aforecited documents is the fact that they are almost always flammable or even highly flammable. Another problem is their low water resistance and still another problem is also the use of volatile substances which start to be liberated from the material after application. They include aldehydes not excepting formaldehyde. Other organic substances are liberated from the binding agents used in the chipboards. They include, for example, phenol formaldehyde, urea formaldehyde, melamine formaldehyde or tannin formaldehyde resins and their mutual combinations.

The goal of this invention is to formulate or to design a wood chip material that is highly fireproof and, at the same time, water resistant.

Principle of the Invention

The aforementioned disadvantages are, to a large extent, eliminated and the goals of the invention accomplished by a wood chip material, especially by a nonflammable water resistant wood chip material, especially by a nonflammable water resistant wood chip material to make oriented strand boards (OSB) the nature of which lies in the fact that it consists of a mixture containing 30 to 43 weight percent of wood chips, 53 to 61.9 weight percent of aqueous solution of silicate, 2 to 5 weight percent of aluminium hydroxide, 1 to 3 weight percent of water, 0.1 to 1 weight percent of a stabilizer of the aqueous solution of silicate, and a hardener of the aqueous solution of sodium silicate in the concentration of 0.5 to 5 weight percent to the pure aqueous solution of sodium silicate providing always that the density of the aqueous solution of sodium silicate ranges from 1370 to 1400 $kg/m^3$ and the molar ratio between silicon dioxide ($SiO_2$) and sodium oxide ($NA_2O$) in the aqueous solution of sodium silicate ranges from 3.2 to 3.4. An advantage of this wood chip material is its high thermal stability, outstanding fire resistance and also its high water resistance. Both these properties are provided by a high proportion of the aqueous solution of sodium silicate. The wood chip material according to this invention also distinguishes itself by excellent antifungal properties and by the fact that it is environmentally friendly and not harmful to health. In addition to that, it is able to resist heat from a burning object and it releases the heat with considerable delay and in a limited extent. The aluminium hydroxide used in the material advantageously acts as a burning retarder. The fact that the mixture of the aqueous solution of silicate and aluminium hydroxide is anchored deep, firmly and stably in the wood, is very advantageous. It is further advantageous if the density of the aqueous solution of silicate ranges from 1370 to 1400 $kg/m^3$ and if the $SiO_2$ to $Na_2O$ molar ratio ranges from 3.2 to 3.4 because such an aqueous solution of silicate is partially elastic after getting dry.

It is advantageous if the wood chips are spruce chips and/or pine chips.

It is also advantageous if hydrophilic alkoxyle alkyl ammonia salts are used as the stabilizer of the aqueous solution of silicate.

The aforementioned disadvantages are, to a large extent, further eliminated and the goals of the invention accomplished by the method of production of a wood chip material, especially by the method of production of a fireproof water resistant wood chip material, especially by a method of production of a fireproof water resistant wood chip material to make oriented strand boards (OSB) the nature of which lies in the following procedure: As the first step, aluminium hydroxide is mixed with water and then wood chips are added into the mixture. Everything is then stirred thoroughly in such a manner that a wood chip mixture is formed. Then, the stabilizer of the aqueous solution of silicate is added in the aqueous solution of silicate and after that the hardener of the aqueous solution of silicate is admixed in this solution. This solution is then stirred for 1 to 10 minutes until a binding solution is formed. Then, the wood chip mixture is poured, at continuous stirring, in the binding solution and everything is stirred thoroughly again. The resulting mixture is then poured in the place of application.

It is advantageous if the resulting mixture is then left at rest until it becomes hardened.

The main advantage of the wood chip material and the method of its production according to this invention is the fact that the material is highly fireproof. Very advantageous is also the fact that the aqueous solution of sodium silicate is used as a binding agent, which, after getting dry, resembles classic glass as for its composition and properties. This binding agent is very hard, abrasion resistant, water resistant and heat resistant to the temperatures up to 1000° C. At the same time, the binding agent is environmentally friendly, not harmful to health and it reflects UV radiation well. It does not liberate any poisonous organic substances. The binding agent has very good sticking and cementing effects and good adhesion to common surfaces. This binding agent binds wood chips very well and efficiently as the surface of the wood chips is entirely and completely covered with this binding agent and thus protected from water, fire and UV radiation. This slows down wood decomposition and reduces emission of organic substances from the wood. Chipboards with this binding agent are very hard, strong, abrasion resistant, fireproof, heat resistant, environmentally friendly and not harmful to health with no emissions of organic substances. A very advantageous property of the wood chip material is its excellent resistance to high temperatures owing to its high content of the aqueous solution of sodium silicate and to its content of aluminium hydroxide as well as its very good insulating power owing to its content of wood chips. At the same time, the parameters of the aqueous solution of sodium silicate ensure very good elasticity which, as a whole, means excellent industrial usability.

EXAMPLES OF THE PERFORMANCE OF THE INVENTION

Example 1

The fireproof water-resistant wood chip material consists of a mixture which contains 36 weight percent of spruce chips, 58.5 weight percent of an aqueous solution of sodium silicate, 3 weight percent of aluminium hydroxide, 2 weight percent of water, and 0.5 weight percent of a stabilizer of the aqueous solution of sodium silicate.

Hydrophilic alkoxyle alkyl ammonia salts in the form of 98-percent aqueous solution of N,N,N',N'-Tetrakis (2-hydroxypropyl) ethylene diamine are used as a stabilizer of the aqueous solution of sodium silicate.

The density of the aqueous solution of sodium silicate is 1380 kg/m$^3$ and its $SiO_2$ to $Na_2O$ molar ratio is 3.3.

The wood chip material further contains a hardener of the aqueous solution of sodium silicate which is a mixture of pure glycerol diacetate/triacetate in the ratio of 7:3 volume parts in the concentration of 0.5 to 5 weight percent to the pure aqueous solution of sodium silicate.

Method of production of the fireproof, water resistant wood chip material is as follows: As the first step, aluminium hydroxide is mixed with water. Then, spruce chips are added into the mixture and everything is then stirred thoroughly in such a manner that a wood chip mixture is formed. Then, the stabilizer of the aqueous solution of sodium silicate is added in the aqueous solution of silicate and after that the hardener of the aqueous solution of sodium silicate is admixed in this solution. This solution is then stirred for 5 minutes until a binding solution is formed. Then, the wood chip mixture is poured, at continuous stirring, in the binding solution and everything is stirred thoroughly again. The resulting mixture is then poured in the place of application which is a board-shaped silicone mould.

In the end, the resulting mixture is left at rest until it becomes hardened.

Example 2

The fireproof water resistant wood chip material consists of a mixture which contains 30 weight percent of pine chips, 61.9 weight percent of an aqueous solution of sodium silicate, 5 weight percent of aluminium hydroxide, 3 weight percent of water, and 0.1 weight percent of a stabilizer of the aqueous solution of sodium silicate.

Hydrophilic alkoxyle alkyl ammonia salts in the form of 98-percent aqueous solution of N,N,N',N'-Tetrakis (2-hydroxypropyl) ethylene diamine are used as a stabilizer of the aqueous solution of sodium silicate.

The density of the aqueous solution of sodium silicate is 1370 kg/m$^3$ and its $SiO_2$ to $Na_2O$ molar ratio is 3.2.

The wood chip material further contains a hardener of the aqueous solution of sodium silicate which is a mixture of pure glycerol diacetate/triacetate in the ratio of 7:3 volume parts in the concentration of 0.5 to 5 weight percent to the pure aqueous solution of sodium silicate.

Method of production of the fireproof, water-resistant wood chip material is as follows: As the first step, aluminium hydroxide is mixed with water. Then, pine chips are added in the mixture and everything is then stirred thoroughly in such a manner that a wood chip mixture is formed. Then, the stabilizer of the aqueous solution of sodium silicate is added in the aqueous solution of silicate and after that the hardener of the aqueous solution of sodium silicate is admixed in this solution. This solution is then stirred for 1 minute until a binding solution is formed. Then, the wood chip mixture is poured, at continuous stirring, in the binding solution and everything is stirred thoroughly again. The resulting mixture is then poured in the place of application which is a board-shaped silicone mould.

In the end, the resulting mixture is left at rest until it becomes hardened.

Example 3

The fireproof water-resistant wood chip material consists of a mixture which contains 43 weight percent of a mixture of spruce and pine chips, 53 weight percent of an aqueous solution of sodium silicate, 2 weight percent of aluminium hydroxide, 1 weight percent of water, and 1 weight percent of a stabilizer of the aqueous solution of sodium silicate.

Hydrophilic alkoxyle alkyl ammonia salts in the form of 98-percent aqueous solution of N,N,N',N'-Tetrakis (2-hydroxypropyl) ethylene diamine are used as a stabilizer of the aqueous solution of sodium silicate.

The density of the aqueous solution of sodium silicate is 1400 kg/m$^3$ and its SiO$_2$ to Na$_2$O molar ratio is 3.4.

The wood chip material further contains a hardener of the aqueous solution of sodium silicate which is a mixture of pure glycerol diacetate/triacetate in the ratio of 7:3 volume parts in the concentration of 0.5 to 5 weight percent to the pure aqueous solution of sodium silicate.

Method of production of the fireproof, water resistant wood chip material is as follows: As the first step, aluminium hydroxide is mixed with water. Then, the mixture of spruce and pine chips is added into the mixture and everything is then stirred thoroughly in such a manner that a wood chip mixture is formed. Then, the stabilizer of the aqueous solution of sodium silicate is added in the aqueous solution of silicate and after that the hardener of the aqueous solution of sodium silicate is admixed in this solution. This solution is then stirred for 10 minutes until a binding solution is formed. Then, the wood chip mixture is poured, at continuous stirring, in the binding solution and everything is stirred thoroughly again. The resulting mixture is then poured in the place of application which is a silicone mould for a 3D-shaped piece.

In the end, the resulting mixture is left at rest until it becomes hardened.

INDUSTRIAL APPLICATION

The wood chip material according to this invention can be used for making shaped pieces or boards especially for applications in the building industry.

The invention claimed is:

1. A fireproof water-resistant wood chip material to make oriented strand boards, comprising a mixture comprising
   30 to 43 weight percent of wood chips,
   53 to 61.9 weight percent of an aqueous solution of sodium silicate,
   2 to 5 weight percent of aluminum hydroxide,
   1 to 3 weight percent of water,
   0.1 to 1 weight percent of a stabilizer of the aqueous solution of silicate, and
   a hardener of the aqueous solution of sodium silicate in the concentration of 0.5 to 5 weight percent to the pure aqueous solution of sodium silicate,
   wherein the density of the aqueous solution of sodium silicate ranges from 1370 to 1400 kg/m$^3$, and
   wherein the SiO$_2$ to Na$_2$O molar ratio in the aqueous solution of sodium silicate ranges from 3.2 to 3.4.

2. The wood chip material according to claim 1, wherein the wood chips are spruce chips and/or pine chips.

3. The wood chip material according to claim 1, wherein hydrophilic alkoxyle alkyl ammonia salts are used as the stabilizer of the aqueous solution of sodium silicate.

4. A method of production of a fireproof water resistant wood chip material to make oriented strand boards of claim 1, wherein in a first step, the aluminum hydroxide is mixed with water, then wood chips are added into the mixture and the resulting mixture is stirred thoroughly in such a manner that a wood chip mixture is formed, then in a second step the stabilizer of the aqueous solution of sodium silicate is added to the aqueous solution of silicate, and after that the hardener of the aqueous solution of sodium silicate is admixed with the resulting solution, then the solution is stirred for 1 to 10 minutes until a binding solution is formed, then the wood chip mixture of the first step is poured, at continuous stirring, in the binding solution of the second step and the resulting mixture is stirred thoroughly before the resulting mixture is poured in the place of application.

5. The method of production of the wood chip material according to claim 4, wherein the resulting mixture is, after being poured in the place of application, is left undisturbed until it becomes hardened.

* * * * *